United States Patent [19]

Makino et al.

[11] Patent Number: 6,117,377
[45] Date of Patent: Sep. 12, 2000

[54] PRODUCTION METHOD OF CORDIERITE CERAMIC HONEYCOMB STRUCTURE

[75] Inventors: Kyoko Makino, Nagoya; Wataru Kotani, Kasugai, both of Japan

[73] Assignee: NGK Insulators, Ltd., Japan

[21] Appl. No.: 09/132,520

[22] Filed: Aug. 11, 1998

[30] Foreign Application Priority Data

Aug. 19, 1997 [JP] Japan .................................. 9-222353

[51] Int. Cl.⁷ ........................ C04B 35/632; C04B 35/195
[52] U.S. Cl. ..................... 264/177.11; 264/630; 264/631; 264/177.12
[58] Field of Search .................................. 264/630, 631, 264/177.11, 177.12

[56] References Cited

U.S. PATENT DOCUMENTS

| | | | |
|---|---|---|---|
| 4,353,854 | 10/1982 | Oyamada et al. ....................... | 264/631 |
| 4,745,092 | 5/1988 | Prunier ..................................... | 501/119 |
| 5,021,373 | 6/1991 | Mitchell et al. ......................... | 501/119 |

FOREIGN PATENT DOCUMENTS 0 680 938 A1  11/1995  European Pat. Off. .

OTHER PUBLICATIONS

The Condensed Chemical Dictionary, 6ᵗʰ Edition, 1961, Reinhold Pub. Corp., New York, p. 912.

*Primary Examiner*—James Derrington
*Attorney, Agent, or Firm*—Parkhurst & Wendel, L.L.P.

[57] ABSTRACT

A production method of a cordierite ceramic honeycomb structure is provided. 0.1 to 2% by weight of a nonionic polyether lubricant, obtained by adding ethylene oxide and propylene oxide to polyhydric alcohol with an ethylene oxide:propylene oxide ratio of 10:90 to 100:0 by weight, is added to the cordierite material batch for extruding. The honeycomb structure has a thin partition wall, and is suitable for the mass production by improving the formability (in particular, the lubricity and the shape stability) in extruding.

5 Claims, No Drawings

PRODUCTION METHOD OF CORDIERITE CERAMIC HONEYCOMB STRUCTURE

BACKGROUND OF THE INVENTION

1. Field of the Invention

The present invention relates to a method for producing a cordierite ceramic honeycomb structure by extrusion.

2. Description of Related Art

Cordierite ceramic honeycomb structures are used as an exhaust gas purifying catalyst carrier, a filter, or a heat exchanger for automobiles or the industrial use.

In order to improve the purifying performance and the heat exchanging efficiency, and reduce the pressure loss, a thin partition wall is adopted in the cordierite ceramic honeycomb structures.

In general, the extruding method is used for the cordierite ceramic honeycomb structure for improving the mass productivity. For the extrusion convenience, a forming auxiliary agent such as a binder and a surfactant is added in the ceramic material batch for extruding.

However, in extruding a thin cordierite ceramic honeycomb structure recently, a problem was discovered in that the unbaked clay can partially aggregate during the extrusion and thus the extrusion property and the shape stability are deteriorated, besides, the pressing area becomes smaller.

Further, if the amount of the binder or the surfactant is increased in order to solve the problems, a crack can be generated in the drying process, and the preheating member needs to be wider due to deashing during firing.

SUMMARY OF THE INVENTION

Accordingly, in order to solve the above-mentioned conventional problems, an object of the present invention is to provide a production method of a cordierite ceramic honeycomb structure, suitable for the mass production, capable of coping with a honeycomb structure with a thin partition wall by improving the formability (in particular, the lubricity and the shape stability) in extruding.

According to the present invention, there is provided a production method of a cordierite ceramic honeycomb structure, which comprises: adding 0.1 to 2% by weight of a nonionic polyether lubricant, based on the total weight of a cordierite material, the obtained by adding ethylene oxide and propylene oxide to polyhydric alcohol with an ethylene oxide:propylene oxide ratio of 10:90 to 100:0 by weight, to the cordierite material batch; and forming the cordierite material batch by extrusion.

It is preferable that the polyhydric alcohol used in the present invention is one selected from the group consisting of ethylene glycol, glycerol, pentaerythritol, and sorbitol.

Further, it is preferable that the nonionic polyether lubricant used in the present invention has 6 or less carbon atoms (functional groups) in the principal chain and a 10,000 or less average molecular weight. It is more preferable that the end group of the nonionic polyether lubricant is a hydroxy ethyl group.

It is further preferable that extrusion dies with a 110 $\mu$m or less slit width are used in extruding.

DESCRIPTION OF THE PREFERRED EMBODIMENTS

In a production method of a cordierite ceramic honeycomb structure according to the present invention, 0.1 to 2% by weight of a nonionic polyether lubricant obtained by adding ethylene oxide and propylene oxide to polyhydric alcohol with an ethylene oxide:propylene oxide ratio of 10:90 to 100:0 by weight is added to the cordierite material batch for extruding.

Accordingly, a honeycomb structure having a thin partition wall, and suitable for mass production can be obtained by improving the formability (in particular, the lubricity and the shape stability) in extruding.

Further, as a main feature of the production method of a cordierite ceramic honeycomb structure according to the present invention, a nonionic polyether lubricant obtained by the condensation polymerization conducted by adding ethylene oxide, or ethylene oxide and propylene oxide to polyhydric alcohol is used.

The nonionic polyether lubricant used in the present invention will be explained in further detail.

A nonionic polyether lubricant used in the present invention can be obtained by adding ethylene oxide and propylene oxide to polyhydric alcohol with an ethylene oxide:propylene oxide ratio of 10:90 to 100:0 by weight for the condensation polymerization.

That is, oxyethylene groups and oxypropylene groups exist in the nonionic polyether lubricant used in the present invention according to the molar ratio of ethylene oxide and propylene oxide.

Accordingly, since a nonionic polyether lubricant having a large number of oxyethylene groups has a sufficient compressive strength (kgf) at the time of extruding, it has an excellent shape stability.

Further, since a nonionic polyether lubricant having a large number of oxypropylene groups can restrain the extrusion pressure (kgf) at the time of extruding, it can contribute to the improvement of the lubricity.

However, although a nonionic polyether lubricant having too little oxyethylene groups (less than 10% oxyethylene groups) has an excellent lubricity, it is insufficient in terms of the shape stability so that it is important to contain at least 10% of oxyethylene groups in order to compensate the shape stability.

The nonionic polyether lubricant is added by 0.1 to 2% by weight, based on the total weight of the cordierite material, as mentioned above because the effect of the lubricant cannot be performed with less than 0.1% by weight so that a complete compact cannot be obtained. On the other hand, concentration difference in the lubricant can be easily generated at the time of drying with more than 2% by weight so that a tear (crack) can be generated at a portion with a high lubricant concentration.

As heretofore mentioned, since the formability (in particular, the lubricity and the shape stability) can be appropriately improved by optionally changing the ratio of ethylene oxide and propylene oxide according to the slit width of a honeycomb structure with a thin partition wall, a honeycomb structure with a thin partition wall having a 110 $\mu$m or less slit width can be preferably produced as well as the isostatic strength (the hydrostatic pressure fracture strength: [kg/cm$^2$]) of the honeycomb structure after firing can be 10 kg/cm$^2$ or more.

The polyhydric alcohol used in the present invention is not particularly limited, but any one selected from the group consisting of ethylene glycol, glycerol, pentaerythritol, and sorbitol is preferable for improving the lubricity by having a low molecular weight.

It is more preferable that the end group of the nonionic polyether lubricant is a hydroxy ethyl group for improving the shape retention property by improving the hydrophilic property.

The present invention will be explained in further detail with reference to examples, but the present invention is not limited thereto.

(Examples 1 to 8, Comparative Examples 1 to 3)

As a cordierite material, which is the main material, one prepared with talc, kaolin (clay mineral), alumina, aluminum hydroxide and silica in the region with 42 to 56% by weight, preferably 47 to 53% by weight of $SiO_2$, 30 to 45% by weight, preferably 32 to 38% by weight of $Al_2O_3$, and 12 to 16% by weight, preferably 12.5 to 15% by weight of MgO, centering the cordierite theoretical composition point ($2MgO \cdot 2Al_2O_3 \cdot 5SiO_2$) conventionally known as a composition for low thermal expansion cordierite ceramics was used.

Hydroxypropyl methyl cellulose was added to the obtained cordierite material as a binder by 5% by weight so as to be used as the cordierite material batch.

Further, 1% by weight of a nonionic polyether lubricant shown in Table 1, based on the total weight of the cordierite material, was added to the obtained cordierite material batch. Further, kneading water was added thereto for mixing and kneading so as to obtain clay mixture. The kneading process was conducted such that a 1200±20 g resistance value can be obtained when a round ball with a 5 mm diameter enters into the clay mixture with a 2 cm/min constant velocity.

As shown in Table 1, the nonionic polyether lubricant was obtained by adding ethylene oxide (EO) and propylene oxide (PO) with a predetermined ratio to polyhydric alcohol as the starting group for the condensation polymerization so as to have a predetermined average molecular weight.

TABLE 1

| Kind of polyhydric alcohol | Composition ratio of oxide (% by weight) EO [*1] | PO [*2] | Molecular weight | Number of carbon atoms in the principal chain (number of functional groups) |
|---|---|---|---|---|
| Example 1 | Ethylene glycol | 100 | 0 | 400 | 2 |
| Example 2 | Glycerol | 70 | 30 | 3000 | 3 |
| Example 3 | Ethylene glycol | 50 | 50 | 3000 | 2 |
| Example 4 | Pentaerythritol | 40 | 60 | 3300 | 4 |
| Example 5 | Glycerol | 30 | 70 | 2400 | 3 |
| Example 6 | Glycerol | 20 | 80 | 3000 | 3 |
| Example 7 | Sorbitol | 20 | 80 | 6000 | 6 |
| Example 8 | Ethylene glycol | 13 | 87 | 4500 | 2 |

TABLE 1-continued

| Kind of polyhydric alcohol | Composition ratio of oxide (% by weight) EO [*1] | PO [*2] | Molecular weight | Number of carbon atoms in the principal chain (number of functional groups) |
|---|---|---|---|---|
| Comparative example 1 | Glycerol | 10 | 90 | 6000 | 3 |
| Comparative example 2 | Ethylene glycol | 0 | 100 | 3000 | 2 |
| Comparative example 3 | Glycerol | 0 | 100 | 6000 | 3 |

[*1]: Ethylene oxide (EO)
[*2]: Propylene oxide (PO)

With the obtained clay mixture, a honeycomb compact and a honeycomb sintered body were produced. Then, the extrusion pressure, the compressive strength, and the isostatic strength (hydrostatic pressure fracture strength: [kg/cm²]) were measured with the below-mentioned conditions.

Results are shown in Table 2.

(Measuring method for the extrusion pressure)

The pressure (kgf) necessary for forming a cylindrical honeycomb compact with a 20 mm diameter at a 30 cm/sec extrusion speed with the obtained clay mixture by extrusion dies having a 110 µm extrusion slit and a 60 cell/cm² cell density was measured.

(Measuring method for the compressive strength)

The maximum resistance value (kgf) generated when a 75×75×60 mm³ honeycomb compact formed with the obtained clay mixture passed through extrusion dies having a 920 µm extrusion slit and a 4 cell/cm² cell density was compressed with a 40×60 mm² flat plate at a 2 cm/min constant velocity was measured.

(Measuring method for the isostatic strength (hydrostatic pressure fracture strength: [kg/cm²])

A honeycomb sintered body was produced by firing a cylindrical honeycomb compact, which was formed by passing through extrusion dies having a 110 µm extrusion slit and a 60 cell/cm² cell density, having a 100 mm diameter and a 150 mm height at 1400° C. or more after drying. The pressure (kg/cm²) at which the obtained honeycomb sintered body was broken in the hydrostatic pressure was measured.

TABLE 2

| | Moldability | | | |
|---|---|---|---|---|
| | Extrusion pressure (kgf) | Compressive strength (kgf) | Comprehensive judgment | ISO strength [*3] (kg/cm²) |
| Example 1 | 28.2 | 4.5 | ◉ | 20.6 |
| Example 2 | 26.5 | 3.8 | ◉ | 18.2 |
| Example 3 | 27.5 | 3.5 | ○ | 17.2 |
| Example 4 | 22.2 | 2.8 | ○ | 18.3 |
| Example 5 | 26.6 | 2.9 | ○ | 21.4 |
| Example 6 | 23.7 | 3.0 | ○ | 16.2 |
| Example 7 | 24.5 | 2.7 | ○ | 13.8 |
| Example 8 | 24.9 | 2.4 | ○ | 15.7 |
| Comparative example 1 | 30.2 | 2.1 | Δ | 7.3 |
| Comparative example 2 | 25.3 | 1.3 | Δ | 11.3 |

TABLE 2-continued

| | Moldability | | | |
|---|---|---|---|---|
| | Extrusion pressure (kgf) | Compressive strength (kgf) | Comprehensive judgment | ISO strength [*3] (kg/cm$^2$) |
| Comparative example 3 | 26.1 | 1.8 | Δ | 9.6 |

[*3]: Isostatic strength (hydrostatic pressure fracture strength)

In Table 2, ◎ denotes Excellent, ○ denotes Good and Δ denotes Inferior.

As heretofore mentioned, according to a production method of a cordierite ceramic honeycomb structure of the present invention, a honeycomb structure having a thin partition wall, and suitable for the mass production can be obtained by improving the formability (in particular, the lubricity and the shape stability) in extruding.

What is claimed is:

1. A method of producing a cordierite ceramic honeycomb structure, comprising the steps of:

adding 0.1 to 2% by weight, based on the total weight of a cordierite material batch, of a nonionic polyether lubricant obtained by adding ethylene oxide and propylene oxide to polyhydric alcohol with an ethylene oxide: propylene oxide ratio of 10:90 to 70:30 by weight, to the cordierite material batch; and forming the honeycomb structure by extruding the cordierite material batch.

2. The production method of a cordierite ceramic honeycomb structure according to claim 1, wherein the polyhydric alcohol is selected from the group consisting of ethylene glycol, glycerol, pentaerythritol, and sorbitol.

3. The production method of a cordierite ceramic honeycomb structure according to claim 1, wherein extrusion dies with a 110 μm or less slit width are used in the extruding step.

4. The production method of a cordierite ceramic honeycomb structure according to claim 2, wherein extrusion dies with a 110 μm or less slit width are used in the extruding step.

5. The production method of cordierite ceramic honeycomb structure according to claim 1, wherein the polyhydric alcohol comprises ethylene glycol.

* * * * *